(12) United States Patent
Zhang

(10) Patent No.: US 12,463,683 B2
(45) Date of Patent: Nov. 4, 2025

(54) BEAM INDICATION METHOD AND APPARATUS, AND COMPUTER-READABLE STORAGE MEDIUM

(71) Applicant: SPREADTRUM COMMUNICATIONS (SHANGHAI) CO., LTD., Shanghai (CN)

(72) Inventor: Meng Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 426 days.

(21) Appl. No.: 17/923,765

(22) PCT Filed: May 8, 2021

(86) PCT No.: PCT/CN2021/092346
§ 371 (c)(1),
(2) Date: Nov. 7, 2022

(87) PCT Pub. No.: WO2021/227982
PCT Pub. Date: Nov. 18, 2021

(65) Prior Publication Data
US 2023/0170942 A1 Jun. 1, 2023

(30) Foreign Application Priority Data
May 9, 2020 (CN) .......... 202010387958.6

(51) Int. Cl.
*H04B 7/024* (2017.01)
*H04B 7/06* (2006.01)
*H04L 5/00* (2006.01)

(52) U.S. Cl.
CPC ......... *H04B 7/024* (2013.01); *H04B 7/06968* (2023.05); *H04L 5/0051* (2013.01)

(58) Field of Classification Search
CPC ..... H04B 7/024; H04B 7/0695; H04L 5/0051; H04L 5/001; H04L 5/0048; H04L 5/0044;
(Continued)

(56) References Cited

U.S. PATENT DOCUMENTS 12,192,841 B2 * 1/2025 Noh .................... H04B 7/0695
2019/0141691 A1 5/2019 Kwon et al.
(Continued)

FOREIGN PATENT DOCUMENTS

CN 109997398 A 7/2019
CN 110535617 A 12/2019
(Continued)

OTHER PUBLICATIONS

CNIPA Second Office Action corresponding to CN Application No. 202010387958.6; Mailing Date, Dec. 5, 2022.
(Continued)

*Primary Examiner* — Don N Vo
(74) *Attorney, Agent, or Firm* — CANTOR COLBURN LLP

(57) ABSTRACT

A beam indication method and apparatus, and a computer-readable storage medium. The beam indication method comprises receiving a TCI, issued by a base station, of a target control resource set; and updating beam information of a target PDSCH and a target PUCCH scheduled by the target control resource set, which comprises taking a QCL-type D RS of the target control resource set as a spatial filter reference signal corresponding to the target PDSCH and the
(Continued)

target PUCCH. By means of the solution, beam information of both an uplink channel and a downlink channel can be simultaneously updated.

18 Claims, 1 Drawing Sheet

(58) Field of Classification Search
CPC .. H04L 5/0053; H04L 5/0023; H04W 72/046; H04W 72/56
USPC .......................................................... 455/101
See application file for complete search history.

(56) References Cited

U.S. PATENT DOCUMENTS

| | | | |
|---|---|---|---|
| 2019/0141693 A1 | 5/2019 | Guo et al. | |
| 2020/0007294 A1 | 1/2020 | Yang et al. | |
| 2022/0030443 A1* | 1/2022 | Chen | H04W 72/21 |
| 2022/0271817 A1* | 8/2022 | Lee | H04B 7/0617 |
| 2022/0278732 A1* | 9/2022 | Xu | H04L 5/0057 |
| 2022/0385415 A1* | 12/2022 | Matsumura | H04W 52/04 |

FOREIGN PATENT DOCUMENTS

| | | |
|---|---|---|
| CN | 110536452 A | 12/2019 |
| WO | 2020056180 A1 | 3/2020 |

OTHER PUBLICATIONS

Fraunhofer et al., "Enhancements on UE multi-beam operation", 3GPP TSG RAN WG1 Meeting #97, R1-1910432, Aug. 14-20, 2019, 6 pages.
International Search Report for International Application No. PCT/CN2021/092346; Mailing date, Jul. 27, 2021.
ZTE, "Maintenance of enhancements on multi-beam operation", 3GPP TSG RAN WG1 Meeting #100bis-e, R1-2001597, Apr. 20-30, 2020, 13 pages.
EPO Extended European Search Report for corresponding EP Application No. 21803145.8; Mailing Date, Sep. 15, 2023.
OPPO, "Discussion on Multi-beam Operation Enhancements", 3GPP TSG RAN WG1 #98, R1-1908352, Aug. 26-30, 2019, 9 pages.

* cited by examiner

US 12,463,683 B2

BEAM INDICATION METHOD AND APPARATUS, AND COMPUTER-READABLE STORAGE MEDIUM

CROSS-REFERENCE TO RELATED APPLICATIONS

This is the U.S. national stage of application No. PCT/CN2021/092346, filed on May 8, 2021. Priority under 35 U.S.C. § 119(a) and 35 U.S.C. § 365(b) is claimed from Chinese Application No. 202010387958.6 filed May 9, 2020, the disclosure of which is also incorporated herein by reference.

TECHNICAL FIELD

The present disclosure generally relates to radio communication technology field, and more particularly, to a beam indication method and apparatus, and a computer-readable storage medium.

BACKGROUND 5G introduced "Transmission Configuration Indication state (TCI-state)" in Release 15, which can be used to indicate Quasi Co-Located (QCL). Transmission configuration indication information may be used to indicate a receiving mode, such as receiving configuration parameters when a User Equipment (UE) receives downlink transmission. Specifically, the UE may receive the corresponding transmission according to a Reference Signal (RS) and a corresponding QCL type in the TCI-state. For example, the QCL type may include Doppler shift, Doppler spread, average delay, delay spread, and/or spatial Rx parameter. TCI may include 1 or 2 RS, the QCL relationship represented by the first RS may be type-A, type-B or type-C, and the second RS may be configured or not. If the second RS is configured, the second RS can only be QCL type-D. The type of RS may be Channel State Information Reference Signal (CSI-RS) or Synchronization Signal Block (SSB), which accurately indicates a sequence number of a CSI-RS resource or a sequence number of the SSB.

Parameters corresponding to QCL type A/B/C/D may include followings.
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

In addition, a base station may configure and send to terminals configuration information, such as spatial correlation information (SpatialRelationInfo). The sending configuration information may be used to indicate a sending mode, such as transmission configuration parameters during uplink transmission. For example, SpatialRelationInfo may include a spatial Tx parameter.

Optionally, SpatialRelationInfo may include at least one of spatial Tx parameter, antenna port indication information, antenna panel sequence number indication information.

Specifically, the terminal may perform the corresponding transmission according to the RS and the corresponding spatial transmission parameters in the SpatialRelationInfo.

And/or, the terminal may perform the corresponding transmission according to the antenna port indication information in SpatialRelationInfo.

And/or, the terminal may perform the corresponding transmission according to the antenna panel sequence number indication information in SpatialRelationInfo.

In Release 16, different Component Carriers (CCs) may have same beam characteristics, thus, a series of simplifications have been made to beam indication. For example, update or indication for a beam of one channel of a CC may be applied to channels relevant with multiple CCs.

SUMMARY

Embodiments of the present disclosure realize simultaneous update of beam information of uplink channel and downlink channel.

In an embodiment of the present disclosure, a beam indication method is provided, including: receiving TCI indication of a target control resource set issued by a base station; and updating beam information of a target Physical Downlink Shared Channel (PDSCH) and a target Physical Uplink Control Channel (PUCCH) scheduled by the target control resource set, wherein a QCL-type D RS in the TCI indication of the target control resource set serves as a spatial domain filter RS corresponding to the target PDSCH and the target PUCCH.

In an embodiment of the present disclosure, a computer-readable storage medium having computer instructions stored therein is provided, wherein when the computer instructions are executed, any one of the above methods is performed.

In an embodiment of the present disclosure, a beam indication apparatus including a memory and a processor is provided, wherein the memory has computer instructions stored therein, and when the processor executes the computer instructions, any one of the above methods is performed.

DETAILED DESCRIPTION

As described in the background, when the update or indication for a beam of one channel of a CC is applied to channels relevant with multiple CCs, the relevant channels are either all uplink channels or all downlink channels, and it is impossible to update beam information of uplink channel and downlink channel simultaneously.

In the embodiments of the present disclosure, after receiving the TCI indication of the target control resource set, the UE utilizes the QCL-type D RS of the target control resource set as the spatial domain filter RS corresponding to the target PDSCH and the target PUCCH, thereby realizing simultaneous update of the beam information of the uplink channel and the downlink channel.

In order to clarify the objects, characteristics and advantages of the disclosure, embodiments of present disclosure will be described in detail in conjunction with accompanying drawings.

Figure 1:
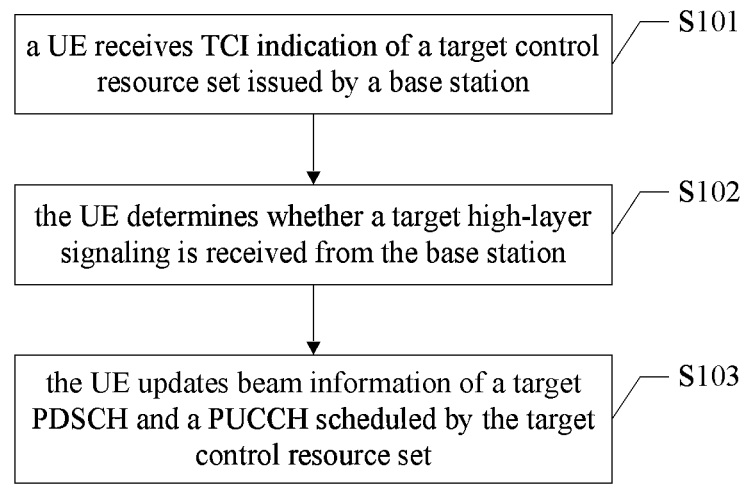
FIG. 1 is a flow chart of a beam indication method according to an embodiment.

FIG. 1 is a flow chart of a beam indication method according to an embodiment. Details of the method are provided via specific steps below.

In some embodiments, the beam indication method including S101 to S103 may be performed by a chip (such as a baseband chip) with a data processing function in the UE, or by a chip module containing a chip with a data processing function in the UE.

In S101, a UE receives TCI indication of a target control resource set issued by a base station.

In some embodiments, the base station (gNB) may send to the UE TCI indication of updating the target CORESET via MAC CE. The UE may receive TCI indication of the target control resource set issued by the base station. A condition for triggering the base station to send the TCI indication of updating the target control resource set to the UE, and how to send the TCI indication of updating the target control resource set to the UE may be referred to existing communication standards and are not described in detail here.

In S103, the UE updates beam information of a target PDSCH and a PUCCH scheduled by the target control resource set.

In some embodiments, after receiving the TCI indication of the target control resource set issued by the base station, the UE may update beam information of the target PDSCH scheduled by the target control resource set, or update beam information of the target PUCCH scheduled by the target control resource set, or update beam information of both the target PDSCH and the PUCCH scheduled by the target control resource set.

In some embodiments, said updating the beam information of the target PDSCH scheduled by the target control resource set may include utilizing the QCL-type D RS in the TCI indication of the target control resource set as the spatial domain filter RS of the target PDSCH. Said updating the beam information of the target PUCCH scheduled by the target control resource set may include utilizing the QCL-type D RS in the TCI indication of the target control resource set as the spatial domain filter RS of the target PUCCH. Similarly, said updating the beam information of both the target PDSCH and the target PUCCH scheduled by the target control resource set may include utilizing the QCL-type D RS in the TCI indication of the target control resource set as the spatial domain filter RS of the target PDSCH and the target PUCCH.

After updating the beam information of the target PDSCH and the target PUCCH scheduled by the target control resource set simultaneously, the base station can no longer send SpatialRelationInfo configuration information of the target PUCCH to the user equipment separately, thereby reducing downlink overhead of the base station.

In some embodiments, before updating the beam information of the target PDSCH and target PUCCH scheduled by the target control resource set, the UE may further determine whether to receive a target high layer signaling issued by the base station.

In some embodiments, the spatial domain filter RS can characterize the beam information to a certain extent, thus, the above solutions may realize linkage update of the beam information of the target PDSCH and the target PUCCH.

In some embodiments, before S103, the UE may further perform S102.

In S102, the UE determines whether a target high layer signaling is received from the base station.

In some embodiments, the UE may determine whether the target high layer signaling is received from the base station. In some embodiments, the target high-layer signaling may be a new high-layer signaling dedicated to indicating whether to perform linkage update on the beam information of the uplink channel and the beam information of the downlink channel. Performing the linkage update on the beam information of the uplink channel and the beam information of the downlink channel refers to simultaneously updating the beam information of the uplink channel when updating the beam information of the downlink channel.

In some embodiments, the uplink channel may be a channel associated with the downlink channel. For example, if HARQ-ACK information of a PDSCH is carried on a PUCCH, it is considered that the PUCCH is associated with the PDSCH. Alternatively, if the HARQ-ACK information of the PDSCH is carried on the PUCCH, it is considered that the PUCCH is associated with a scheduling PDCCH corresponding to the PDSCH.

Alternatively, if the HARQ-ACK information of the PDSCH is carried on the PUCCH, it is considered that the PUCCH is associated with a CORESET where the scheduling PDCCH corresponding to the PDSCH is located.

Alternatively, if the HARQ-ACK information of the PDSCH is carried on a PUCCH, it is considered that the PUCCH is associated with the PDSCH and the scheduling PDCCH corresponding to the PDSCH.

Alternatively, if the HARQ-ACK information of the PDSCH is carried on a PUCCH, it is considered that the PUCCH is associated with the PDSCH and the CORESET where the scheduling PDCCH corresponding to the PDSCH is located.

Alternatively, if the PUCCH is indicated and determined by the PDCCH or the CORESET, it is considered that the PUCCH is associated with the PDDCCH or the CORESET.

In some embodiments, the target high layer signaling may be enableuniversalbeam signaling. By setting a value of enableuniversalbeam, it is determined whether to perform linkage update on the beam information of the uplink channel and the beam information of the downlink channel.

For example, when enableuniversalbeam=1, the beam information of the uplink channel and the beam information of the downlink channel are updated in linkage; and when enableuniversalbeam=0, the beam information of the uplink channel and the beam information of the downlink channel are not updated in linkage simultaneously. Alternatively, when enableuniversalbeam=0, the beam information of the uplink channel and the beam information of the downlink channel are updated in linkage; and when enableuniversalbeam=1, the beam information of the uplink channel and the beam information of the downlink channel are not updated in linkage simultaneously.

For another example, when enableuniversalbeam is set to be true, the beam information of the uplink channel and the beam information of the downlink channel are updated in linkage; and when enableuniversalbeam is set to be false, the beam information of the uplink channel and the beam information of the downlink channel are not updated in linkage simultaneously.

In some embodiments, the downlink channel may be a target PDSCH scheduled by the target control resource set. Alternatively, the downlink channel may be a target PDSCH scheduled by the PDCCH in the target control resource set. The uplink channel may be a target PUCCH indicated by the target control resource set. Alternatively, the uplink channel may be a PUCCH indicated by the PDCCH in the target control resource set. The target PUCCH may be used to carry the target control resource set or HARQ-ACK information corresponding to the target PDSCH scheduled by the PDCCH in the target control resource set. Alternatively, the target PUCCH may be used to carry the target control resource set or channel status feedback information indicated by the PDCCH in the target control resource set.

In some embodiments, there is no logical sequence between S101 and S102. That is, S101 may be performed prior to S102 or following S101.

In some embodiments, the QCL-type D RS of the target control resource set may be utilized as a path loss RS of the target PUCCH. Optionally, the above operation may be performed after determining the receipt of the target high layer signaling. In this case, the base station can no longer send the path loss RS of the target PUCCH to the UE separately, thereby reducing downlink overhead of the base station.

In some embodiments, as the UE can utilize the QCL-type D RS of the target control resource set as the spatial domain filter RS corresponding to the target PUCCH, the UE has learned spatial correlation information corresponding to the target PUCCH. Therefore, the base station may not separately send the spatial correlation information (SpatialRelationInfo configuration information) corresponding to the target PUCCH to the UE. However, in practice, it is not excluded that the base station sends the spatial correlation information corresponding to the target PUCCH to the UE again. In this case, the UE may select one from the spatial correlation information sent by the base station again and the spatial domain filter RS corresponding to the target PUCCH as the updated beam information corresponding to the target PUCCH.

In some embodiments, the base station may separately send the spatial correlation information corresponding to the target PUCCH to the UE through a first MAC CE. In S101, the base station may send to the UE TCI indication of the updated target control resource set via a second MAC CE.

In some embodiments, a priority of the first MAC CE and a priority of the second MAC CE are obtained respectively, and the priorities are compared. When the priority of the first MAC CE is higher than that of the second MAC CE, the spatial correlation information is selected as the updated beam information corresponding to the PUCCH. Conversely, when the priority of the first MAC CE is lower than that of the second MAC CE, the spatial domain filter RS corresponding to the target PUCCH is selected as the updated beam information corresponding to the PUCCH.

That is, according to the priorities of the MAC CEs carried, the spatial correlation information carried on the MAC CE with higher priority is selected as the updated beam information corresponding to the PUCCH.

In some embodiments, a first time point of receiving a first MAC CE carrying the spatial correlation information, and a second time point of receiving a second MAC CE carrying the TCI indication may be obtained, respectively, and sequences of the first time point and the second time point in timing are compared. When the first time point is earlier than the second time point, the spatial filter domain RS of the target PUCCH is selected as the updated beam information corresponding to the PUCCH. When the first time point is later than the second time point, the spatial correlation information is selected as the updated beam information of the PUCCH.

That is, according to a timing order of the received MAC CEs, the spatial correlation information carried by the MAC CE received later is selected as the updated beam information of the PUCCH.

It is understandable that in practice, there are other ways to select one from the spatial correlation information and the spatial domain filter RS corresponding to the target PUCCH as the beam information of the updated target PUCCH.

In some embodiments, as the UE can use the QCL-type D RS of the target control resource set as the spatial domain filter RS corresponding to the target PDSCH, the base station may not separately send the spatial correlation information corresponding to the target PDSCH to the UE. If the base station updates the TCI state of PDSCH through MAC-CE, the UE may ignore the configuration information of the base station.

In some embodiments, the target control resource set may correspond to a CC which may belong to a CC list containing one or more CCs. In some embodiments, when a CC corresponding to the target control resource set belongs to the CC list, other control resource sets with the same identity as the target control resource set in the CC list may be obtained. The QCL-type D RS of the target control resource set is utilized as the spatial domain filter RS corresponding to PDSCH and/or PUCCH of the other control resource sets.

For example, the identity of the target control resource set is 1, the CC corresponding to the target control resource set is CC 1, and the CC list corresponding to the CC includes three CCs, which are CC 1, CC 2, and CC 3. If there is a control resource set with an identity 1 in CC 2, the beam information corresponding to PDSCH and/or PUCCH scheduled by the control resource set 1 corresponding to CC 2 is updated to the QCL-type D RS of the target control resource set.

In some embodiments, the QCL-type D RS of the target control resource set may be utilized as the spatial domain filter RS of the target PUSCH, and/or, the QCL-type D RS of the target control resource set may be utilized as the path loss RS of the target PUSCH. The target PUSCH corresponds to the target control resource set. The PDCCH schedules target PUSCH exists in the target control resource set. The spatial domain filter configuration information of the target PUSCH may be referred to the QCL-type D RS of the target control resource set. The above operation may be performed following determining the receipt of the target high layer signaling, that is, after S102.

From above, after receiving the TCI indication of the target control resource set, the UE utilizes the QCL-type D RS of the target control resource set as the spatial domain filter RS corresponding to the target PDSCH and/or the target PUCCH, thereby realizing simultaneous update of the beam information of the uplink channel and the downlink channel.

Further, the QCL-type D RS of the target control resource set is utilized as the spatial domain filter RS of the target PUSCH, which may realize simultaneous update of the beam information of the uplink channel and the downlink channel.

Figure 2:
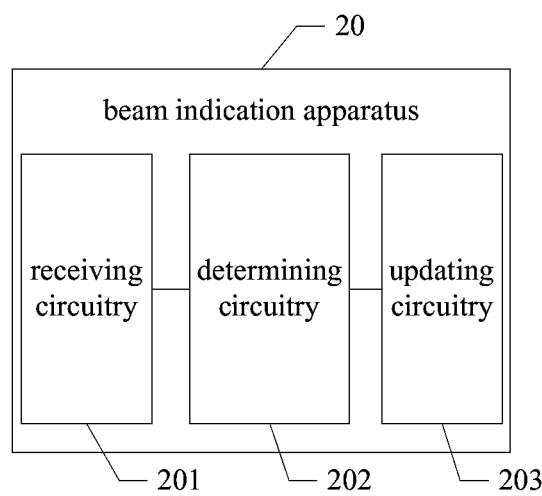
FIG. 2 is a structural diagram of a beam indication apparatus according to an embodiment.

FIG. 2 is a structural diagram of a beam indication apparatus 20 according to an embodiment. The apparatus 20 includes a receiving circuitry 201 configured to receive TCI indication of a target control resource set issued by a base station; and an updating circuitry 203 configured to update beam information of a target PDSCH and a target PUCCH scheduled by the target control resource set, wherein a QCL-type D RS in the TCI indication of the target control resource set serves as a spatial domain filter RS corresponding to the target PDSCH and the target PUCCH.

In some embodiments, the updating circuitry 203 is further configured to: utilize the QCL-type D RS of the target control resource set as a path loss RS of the target PUCCH.

In some embodiments, the receiving circuitry 201 is further configured to receive spatial correlation information corresponding to the target PUCCH issued by the base station; and the updating circuitry 203 is further configured to select the spatial correlation information corresponding to the target PUCCH or the spatial domain filter RS corresponding to the target PUCCH as the updated beam information of the target PUCCH.

In some embodiments, the updating circuitry 203 is configured to: obtain a priority of a first MAC CE carrying the spatial correlation information, and a priority of a second MAC CE carrying the TCI indication; based on that the priority of the first MAC CE is higher than that of the second MAC CE, select the spatial correlation information as the updated beam information of the target PUCCH; and based on that the priority of the first MAC CE is lower than that of the second MAC CE, select the spatial domain filter RS as the updated beam information of the target PUCCH.

In some embodiments, the updating circuitry 203 is configured to: obtain a first time point of receiving a first MAC CE carrying the spatial correlation information, and a second time point of receiving a second MAC CE carrying the TCI indication; based on that the first time point is earlier than that of the second time point, select the spatial domain filter RS as the updated beam information of the target PUCCH; and based on that the first time point is later than that of the second time point, select the spatial correlation information as the updated beam information of the target PUCCH.

In some embodiments, the updating circuitry 203 is further configured to: determine other control resource sets which have a same identity as the target control resource set in a component carrier list; and utilize the QCL-type D RS of the target control resource set as a spatial domain filter RS corresponding to PDSCH and PUCCH of the other control resource sets.

In some embodiments, the updating circuitry 203 is further configured to: utilize the QCL-type D RS of the target control resource set as the spatial domain filter RS of a target PUSCH and/or a path loss RS of the target PUSCH, wherein the target PUSCH corresponds to the target control resource set.

In some embodiments, the apparatus 20 further includes: a determining circuitry 202 configured to determine that a target high layer signaling is received from the base station before the updating circuitry 203 updates the beam information of the target PDSCH and the target PUCCH scheduled by the target control resource set.

In some embodiments, the beam indication apparatus 20 may correspond to a chip with a data processing function in a UE, or to a chip module containing a chip with a data processing function in a UE, or to a UE.

In some embodiments, modules/units included in each apparatus and product described in the above embodiments may be software modules/units, hardware modules/units, or a combination of software modules/units and hardware modules/units.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a computer-readable storage medium having computer instructions stored therein is provided, wherein when the computer instructions are executed, any one of the above methods is performed.

In an embodiment of the present disclosure, a beam indication apparatus including a memory and a processor is provided, wherein the memory has computer instructions stored therein, and when the processor executes the computer instructions, any one of the above methods is performed.

Those skilled in the art could understand that all or part of steps in the various methods in the above embodiments can be completed by instructing relevant hardware through a program, and the program can be stored in any computer-readable storage medium which includes a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A beam indication method, comprising:
receiving Transmission Configuration Indication (TCI) indication of a target control resource set issued by a base station; and
updating beam information of a target Physical Downlink Shared Channel (PDSCH) and a target Physical Uplink Control Channel (PUCCH) scheduled by the target control resource set, wherein a Quasi Co-Located (QCL)-type D Reference Signal (RS) in the TCI indication of the target control resource set serves as a spatial domain filter RS corresponding to the target PDSCH and the target PUCCH;
wherein prior to updating the beam information of the target PDSCH and the target PUCCH scheduled by the target control resource set, the method further comprises: determining that a target high-layer signaling is received from the base station;
wherein the target high-layer signaling is an enableuniversalbeam signaling, the beam information of the uplink channel and the beam information of the downlink channel are updated in linkage in response to the enableuniversalbeam signaling being set to be true, or the beam information of the uplink channel and the beam information of the downlink channel are not updated in linkage simultaneously in response to the enableuniversalbeam signaling being set to be false.

2. The method according to claim 1, wherein following receiving the TCI indication of the target control resource set issued by the base station, the method further comprises:
utilizing the QCL-type D RS of the target control resource set as a path loss RS of the target PUCCH.

3. The method according to claim 1, further comprising:
receiving spatial correlation information corresponding to the target PUCCH issued by the base station; and
selecting the spatial correlation information corresponding to the target PUCCH or the spatial domain filter RS corresponding to the target PUCCH as the updated beam information of the target PUCCH.

4. The method according to claim 3, wherein said selecting the spatial correlation information corresponding to the target PUCCH or the spatial domain filter RS corresponding to the target PUCCH as the updated beam information of the target PUCCH comprises:
obtaining a priority of a first Media Access Control (MAC) Control Element (CE) carrying the spatial correlation information, and a priority of a second MAC CE carrying the TCI indication;
based on that the priority of the first MAC CE is higher than that of the second MAC CE, selecting the spatial correlation information as the updated beam information of the target PUCCH; and
based on that the priority of the first MAC CE is lower than that of the second MAC CE, selecting the spatial domain filter RS as the updated beam information of the target PUCCH.

5. The method according to claim 3, wherein said selecting the spatial correlation information corresponding to the target PUCCH or the spatial domain filter RS corresponding to the target PUCCH as the updated beam information of the target PUCCH comprises:
obtaining a first time point of receiving a first MAC CE carrying the spatial correlation information, and a second time point of receiving a second MAC CE carrying the TCI indication;
based on that the first time point is earlier than that of the second time point, selecting the spatial domain filter RS as the updated beam information of the target PUCCH; and
based on that the first time point is later than that of the second time point, selecting the spatial correlation information as the updated beam information of the target PUCCH.

6. The method according to claim 1, wherein said updating the beam information of the target PDSCH and the target PUCCH scheduled by the target control resource set further comprises:
determining other control resource sets which have a same identity as the target control resource set in a component carrier list; and
utilizing the QCL-type D RS of the target control resource set as a spatial domain filter RS corresponding to PDSCH and PUCCH of the other control resource sets.

7. The method according to claim 1, further comprising:
utilizing the QCL-type D RS of the target control resource set as the spatial domain filter RS of a target Physical Uplink Shared Channel (PUSCH) and/or a path loss RS of the target PUSCH, wherein the target PUSCH corresponds to the target control resource set.

8. A non-transitory computer readable storage medium storing one or more programs, the one or more programs comprising computer instructions, which, when executed by a processor, cause the processor to:
receive Transmission Configuration Indication (TCI) indication of a target control resource set issued by a base station; and
update beam information of a target Physical Downlink Shared Channel (PDSCH) and a target Physical Uplink Control Channel (PUCCH) scheduled by the target control resource set, wherein a Quasi Co-Located (QCL)-type D Reference Signal (RS) in the TCI indication of the target control resource set serves as a spatial domain filter RS corresponding to the target PDSCH and the target PUCCH;
wherein the processor is further caused to: prior to updating the beam information of the target PDSCH and the target PUCCH scheduled by the target control resource set, determine that a target high-layer signaling is received from the base station;
wherein the target high-layer signaling is an enableuniversalbeam signaling, the beam information of the uplink channel and the beam information of the downlink channel are updated in linkage in response to the enableuniversalbeam signaling being set to be true, or the beam information of the uplink channel and the beam information of the downlink channel are not updated in linkage simultaneously in response to the enableuniversalbeam signaling being set to be false.

9. The non-volatile or non-transitory computer-readable storage medium according to claim 8, wherein the processor is further caused to utilize the QCL-type D RS of the target control resource set as a path loss RS of the target PUCCH.

10. The non-volatile or non-transitory computer-readable storage medium according to claim 8, wherein the processor is further caused to:
receive spatial correlation information corresponding to the target PUCCH issued by the base station; and
select the spatial correlation information corresponding to the target PUCCH or the spatial domain filter RS corresponding to the target PUCCH as the updated beam information of the target PUCCH.

11. The non-volatile or non-transitory computer-readable storage medium according to claim 8, wherein the processor is further caused to:
utilize the QCL-type D RS of the target control resource set as the spatial domain filter RS of a target Physical Uplink Shared Channel (PUSCH) and/or a path loss RS of the target PUSCH, wherein the target PUSCH corresponds to the target control resource set.

12. A beam indication apparatus, comprising a memory and a processor, wherein the memory stores one or more programs, the one or more programs comprising computer instructions, which, when executed by the processor, cause the processor to:
receive Transmission Configuration Indication (TCI) indication of a target control resource set issued by a base station; and
update beam information of a target Physical Downlink Shared Channel (PDSCH) and a target Physical Uplink Control Channel (PUCCH) scheduled by the target control resource set, wherein a Quasi Co-Located (QCL)-type D Reference Signal (RS) in the TCI indication of the target control resource set serves as a spatial domain filter RS corresponding to the target PDSCH and the target PUCCH;
wherein the processor is further caused to: prior to updating the beam information of the target PDSCH and the target PUCCH scheduled by the target control resource set, determine that a target high-layer signaling is received from the base station;
wherein the target high-layer signaling is an enableuniversalbeam signaling, the beam information of the uplink channel and the beam information of the downlink channel are updated in linkage in response to the enableuniversalbeam signaling being set to be true, or the beam information of the uplink channel and the beam information of the downlink channel are not updated in linkage simultaneously in response to the enableuniversalbeam signaling being set to be false.

13. The beam indication apparatus according to claim 12, wherein the processor is further caused to utilize the QCL-type D RS of the target control resource set as a path loss RS of the target PUCCH.

14. The beam indication apparatus according to claim 12, wherein the processor is further caused to:
receive spatial correlation information corresponding to the target PUCCH issued by the base station; and
select the spatial correlation information corresponding to the target PUCCH or the spatial domain filter RS corresponding to the target PUCCH as the updated beam information of the target PUCCH.

15. The beam indication apparatus according to claim 14, wherein said selecting the spatial correlation information corresponding to the target PUCCH or the spatial domain filter RS corresponding to the target PUCCH as the updated beam information of the target PUCCH comprises:
obtaining a priority of a first Media Access Control (MAC) Control Element (CE) carrying the spatial correlation information, and a priority of a second MAC CE carrying the TCI indication;
based on that the priority of the first MAC CE is higher than that of the second MAC CE, selecting the spatial correlation information as the updated beam information of the target PUCCH; and
based on that the priority of the first MAC CE is lower than that of the second MAC CE, selecting the spatial domain filter RS as the updated beam information of the target PUCCH.

16. The beam indication apparatus according to claim 14, wherein said selecting the spatial correlation information corresponding to the target PUCCH or the spatial domain filter RS corresponding to the target PUCCH as the updated beam information of the target PUCCH comprises:
obtaining a first time point of receiving a first MAC CE carrying the spatial correlation information, and a second time point of receiving a second MAC CE carrying the TCI indication;
based on that the first time point is earlier than that of the second time point, selecting the spatial domain filter RS as the updated beam information of the target PUCCH; and
based on that the first time point is later than that of the second time point, selecting the spatial correlation information as the updated beam information of the target PUCCH.

17. The beam indication apparatus according to claim 12, wherein said updating the beam information of the target PDSCH and the target PUCCH scheduled by the target control resource set further comprises:
determining other control resource sets which have a same identity as the target control resource set in a component carrier list; and
utilizing the QCL-type D RS of the target control resource set as a spatial domain filter RS corresponding to PDSCH and PUCCH of the other control resource sets.

18. The beam indication apparatus according to claim 12, wherein the processor is further caused to:
utilize the QCL-type D RS of the target control resource set as the spatial domain filter RS of a target Physical Uplink Shared Channel (PUSCH) and/or a path loss RS of the target PUSCH, wherein the target PUSCH corresponds to the target control resource set.

* * * * *